United States Patent [19]

Pires

[11] 4,068,264
[45] Jan. 10, 1978

[54] PAY TELEVISION SYSTEM UTILIZING BINARY CODING

[75] Inventor: H. George Pires, Parlin, N.J.
[73] Assignee: Teleglobe Pay-TV System, Inc.
[21] Appl. No.: 706,929
[22] Filed: July 19, 1976
[51] Int. Cl.² ............................................. H04N 1/44
[52] U.S. Cl. ................................... 358/122; 358/84; 358/123; 358/124
[58] Field of Search ................. 358/122, 123, 124, 84

[56] References Cited

U.S. PATENT DOCUMENTS

| | | | |
|---|---|---|---|
| 3,668,307 | 6/1972 | Face et al. | 358/86 |
| 3,789,131 | 1/1974 | Harney | 358/122 |
| 3,801,732 | 4/1974 | Reeves | 358/124 |
| 3,878,322 | 4/1975 | Sullivan | 358/84 |
| 3,886,302 | 5/1975 | Kosco | 358/86 |
| 3,919,462 | 11/1975 | Hartung | 358/124 |
| 3,924,059 | 12/1975 | Horowitz | 358/124 |
| 3,934,079 | 1/1976 | Barnhart | 358/86 |
| 4,025,948 | 5/1977 | Loshin | 358/122 |

Primary Examiner—S. C. Buczinski

[57] ABSTRACT

At the sending end randomly generated binary code number signals are inserted into predetermined lines of the vertical retrace interval. The code number signals are also processed in accordance with a program assignment code to change or leave unchanged a predetermined characteristic of the television signal. Periodically, program identification signals, each signifying a program identification number, are inserted into the television signal instead of the binary code number signals. At the receiving end, the program identification signals are utilized to address a random access memory which furnishes program assignment signals. The program assignment signals control logic circuits to process the code number signals in accordance with the same program assignment code utilized at the transmitter. The output of these logic circuits is then utilized to decode the received encoded signal. Further, means are furnished to record the program identification number in the random access memory at the receiver for billing purposes, if the subscriber indicates acceptance of the program. Both this recording and the decoding of the encoded signal are impeded if a catagory switch at the decoder furnishes a catagory selection number which does not correspond to a catagory selection number inserted into the encoded television signal at the transmitting end.

11 Claims, 7 Drawing Figures

| HEXADEC. No. | LINE 3 (16'S) | LINE 2 (1'S) |
|---|---|---|
| 07 | 0 0 0 0 | 0 1 1 1 |
| 08 | 0 0 0 0 | 1 0 0 0 |
| 15 | 0 0 0 1 | 0 1 0 1 |

FIG. 5

PAY TELEVISION SYSTEM UTILIZING BINARY CODING

BACKGROUND OF THE INVENTION

The present invention resides in a pay television system, and more specifically in the type of pay television system disclosed in U.S. Pat. No. 3,924,059 (Horowitz). In this patent a pay television system is disclosed wherein, in addition to other features, the video signal information is inverted relative to the synchronizing portions of the signal prior to transmission during randomly selected frames. Whether or not the signal is so inverted is determined by the output of a bistable circuit, referred to as a "polarity flip-flop". If the polarity flip-flop is in a SET state, the video signal portion of the composite television signal is inverted, while if it is in a RESET state, no inversion takes place prior to transmission. In order that this inversion, if present, may be compensated for at the receiver, a code signal or burst is added to the mixer at predetermined time instants during the vertical blanking interval, again prior to transmission. At the receiver the code burst sets set a polarity flip-flop to the state corresponding to the state of the polarity flip-flop at the transmitter, thereby causing reinversion of the video portion of the received signal when required.

In a copending application, U.S. application Ser. No. 552,787, filed Feb. 25, 1975, entitled "Coding System for Pay Television Apparatus", a coding system is disclosed wherein code bursts, that is oscillations of different frequencies, rather than just a single code burst, are applied to the television signal within predetermined horizontal line intervals in the vertical blanking interval. In a preferred embodiment disclosed in said application, six code bursts are utilized. A control panel is furnished which allows assignment of any of these code bursts to either an "A" mode, a "B" mode, a "C" mode or a "D" mode. Any code burst assigned to the (A) mode causes the polarity flip-flop to be reset. Any code burst assigned to the "B" causes the polarity flip-flop to be set, while "D" code burst causes a toggling of the polarity flip-flop, that is the polarity flip-flop fade is changed. Code bursts assigned to the "C" mode do not affect the polarity flip-flop at all but are used simply to confuse possible "pirates", that is people wishing to break the code in order to avoid payment of fees. These code bursts are inserted into the composite television signal during predetermined lines of vertical blanking interval. At the receiver the code bursts are detected and used to control a polarity flip-flop which in turn controls the reinversion of the portions of the television signal which were inverted at the transmitter. In the above-identified Loshin application at the transmitter the assignment of each of the tone bursts (eight different tone frequencies are used) to the "A", "B", "C" or "D" mode is carried out by logic circuits which include externally operable switches. At the decoder the tone bursts are filtered out and the corresponding logic circuits are set up in accordance with a punch card having a program corresponding to the code assignment at the transmitter.

The disadvantages of the above-described Loshin system are that the operation of the whole system depends upon the accuracy of the frequencies of the individual tones. But differences in path length can cause distortions in the received frequency, as can interfering elements such as, for example, airplanes. At the receiver, there is some problem with the selectivity of the tuned circuits, which must be high enough to reject extraneous noise signals and at the same time sufficiently broad to include the above-mentioned possible distortions. Further, the cost of the system is relatively high.

A further disadvantage of the known system is that the subscriber must insert the program card carrying the code assignments.

SUMMARY OF THE INVENTION

It is an object of the present invention to furnish a binary-type coding system to replace the tone bursts of the known system.

It is a further object of the present invention to furnish a coded television system wherein only minimal cooperation by the subscriber is required for setting up the program assignment code.

The present invention is a subscriber television system which comprises, at the sending end, code number signal furnishing means for furnishing sets of code number signals each signifying a corresponding number. It further comprises program identification signal furnishing means for furnishing sets of binary program identification signals each signifying a program identification number. Means are also provided at the sending end for inserting said binary code number signals and said program assignment signals into said television signal at predetermined time instants thereof. Encoder means are furnished at the sending end for encoding said television signal at least in part under control of said sets of binary code number signals. Means are furnished for sending the so-encoded television signal to the receiving end. At the receiving end, demodulating means are furnished for generating said sets of code number signals and said sets of program identification signals in response to the received encoded television signal. Further, decoding means are furnished which operate under control of said binary program identification signals and are responsive to said binary code number signals for decoding said encoded television signal, thereby furnishing a decoded television signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A preferred embodiment of the present invention will now be described with reference to the drawing. However, it should be noted that where timing signals are required for the present invention which were required for either the above-identified patent or the above-identified copending application, the derivation of these timing signals will not again be discussed in detail. Each timing signal will be identified and its time duration clearly stated.

In accordance with the present invention, the tones which are inserted into specified horizontal line intervals during the vertical retrace interval in the known system are replaced by a binary coded decimal number. More specifically, a single binary coded digit is transmitted serially on each line. There are six lines during the vertical interval together containing six binary coded decimal digits.

Figure 1:
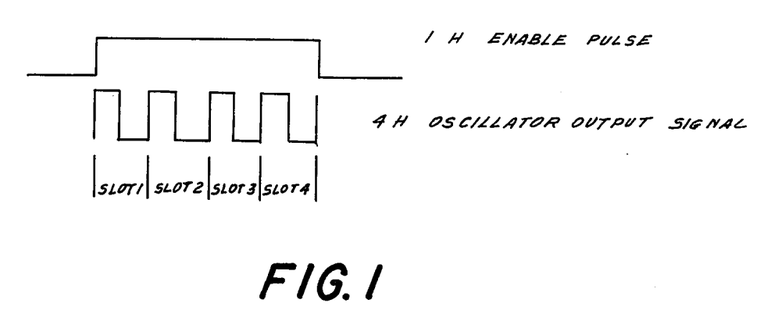
FIG. 1 illustrates waveforms used in the present invention.

The format of each of the horizontal line intervals during the vertical blanking interval which is to carry one of the binary coded decimal code digits is as follows: The period of the line which is free of synchronization and blanking signals, that is that portion of the horizontal line interval which occurs following the trailing edge of the last previous horizontal blanking signal and before the leading edge of the next subsequent horizontal blanking signal, is divided into four parts, indicated as slot 1, slot 2, slot 3 and slot 4 in FIG. 1. The pulse shown as the 1 H enable pulse shown in FIG. 1, defines the portion of the horizontal line interval described above. Also shown in FIG. 1 is an oscillator output signal which, it will be noted, has a frequency somewhat higher than four times the horizontal line frequency. The oscillator output signal is so synchronized with the 1 H enable pulse that the trailing edge of each of its output pulses falls substantially in the center of the corresponding slot. The oscillator output signal is used as a timing signal to sample each of the four slots at the correct time both for insertion of the binary bit and for decoding purposes at the receiver. This oscillator output signal is herein referred to as a 4 H oscillator output signal and the oscillator furnishing it as the 4 H oscillator.

Thus at the encoder at the transmitting end, during each vertical retrace interval or, alternatively, during selected vertical retrace intervals, code information is transmitted during six lines which, in the preferred embodiment, are six consecutive lines. The so-transmitted numbers are herein referred to as code numbers. It is further required that a validation code (see also the copending application Ser. No. 553,436, filed Feb. 24, 1975 (Nieson), assigned to the same assignee) be repeated once per second over a six field period. The validation code is a fixed set of numbers which will be discussed in greater detail below. Further it is required that once per second on the half second, the program identification number, whose function is discussed in great detail in connection with the decoder circuitry at the receiver, be transmitted. This program identification number is a two-digit number. Its transmission is signalled by an identification flag which, in a preferred embodiment of the present invention, is the number 9. Following the program identification number is a one-digit number designating the selected catagory. This too will be discussed in greater detail below. At present, only the circuits for inserting the required information into the transmitted signal will be discussed with reference to FIG. 2. The circuitry for inserting the random numbers into the coded television signal includes a random number generator which comprises an oscillator 201 whose output frequency is high with respect to the horizontal drive frequency. The output of oscillator 201 is applied to a three-stage counter 202 comprising flip-flops FF1, FF2 and FF3. The output of flip-flop FF3 is connected through a differentiating circuit to the PRESET input of a further flip-flop FF4. The PRESET input of flip-flop FF4 is set by the negative going edge of the Q output of flip-flop FF3. The data input of flip-flop FF4 is grounded. The Q outputs of the four flip-flops are connected to the data input of a parallel-in/serial-out register 203. The load control input for register 203 is supplied with horizontal drive pulses. The clock input controlling the serial output of register 203 is controlled by the output of the 4 H oscillator described above. This is designated by reference numeral 204 in FIG. 2. 4 H oscillator 204 is enabled by the output of a six line counter 206 which counts horizontal drive pulses following each vertical drive pulse up to the count of 6. The horizontal drive pulses applied to six line counter 206 are also applied to a four line counter 207 which serves to count the first four lines in the vertical retrace interval. The vertical drive pulses are also applied to a frequency divider 208 which furnishes a pulse toggling a flip-flop FF5 once every half second. The Q output of flip-flop FF5 is applied to a gate 209 through a monostable multivibrator 208a. Gate 209 has two further inputs receiving, respectively, the 4 H oscillator output signal and the output signal of counter 207. A first output of gate 209 is applied to the first inhibit input of gate 205, while the second output of gate 209 is applied as an input to a parallel-in, serial-out register 210. Register 210 is a 96-bit register which receives its input from a validation code input 211.

Figure 2:
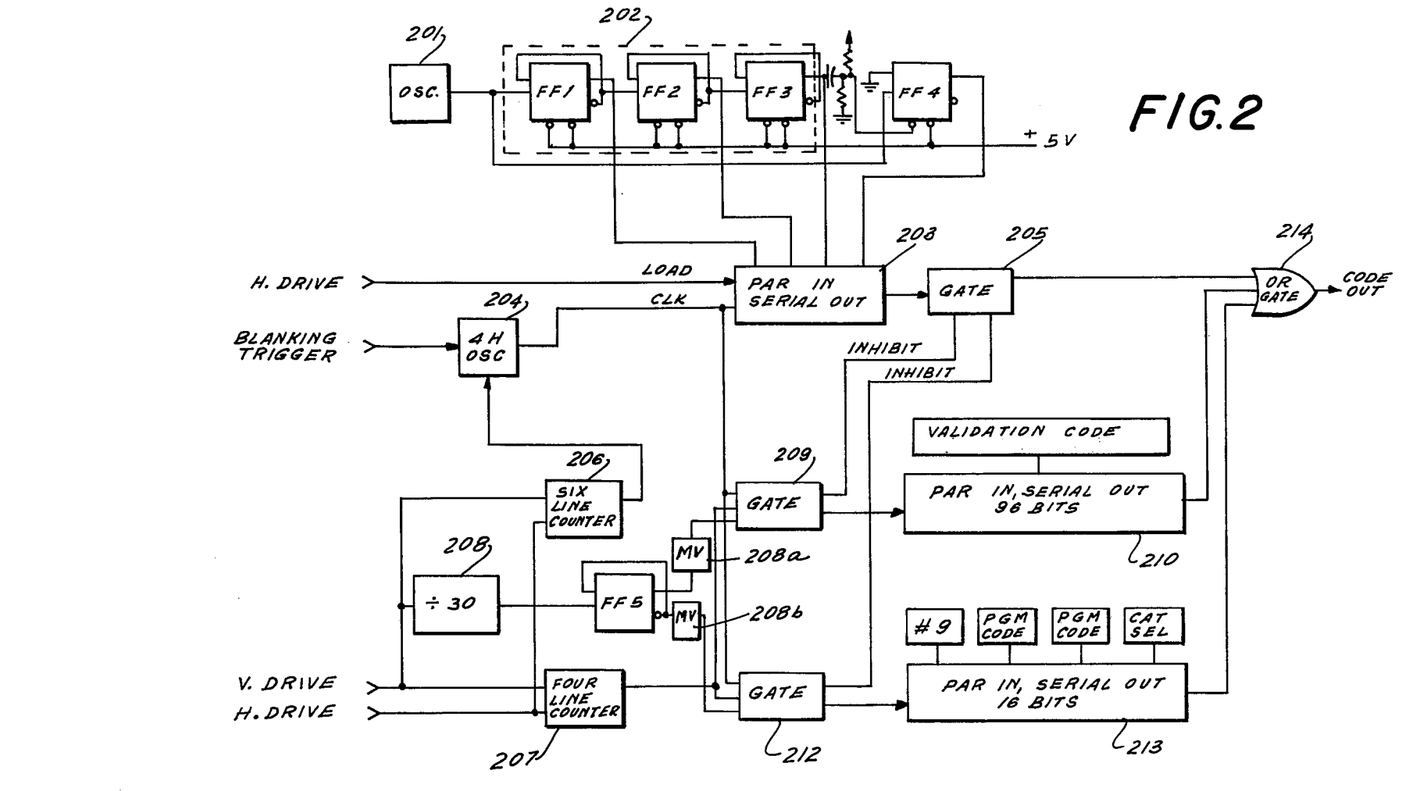
FIG. 2 is a block diagram of circuits at the sending end.

The Q output of flip-flop FF5 constitutes, after passing through a monostable multivibrator 208b, one input of a gate 212 whose second input receives the 4 H oscillator output signal and whose third input is connected to the output of counter 207. One output of gate 212 is connected to the second inhibit input of gate 205, while the other output is connected to the input of a parallel-in, serial-out register 213. The inputs of register 213 are connected to receive the identification flag number 9, the two program assignment code digits and the catalog selector digit. The outputs of gate 205, register 210 and register 213 are each connected to an input of an OR-gate 214. The output of OR-gate 214 is mixed with the coded television signal prior to transmission.

The above-described equipment operates as follows:

The output pulses of oscillator 201 are counted in standard fashion by counter 202. Each time the most significant bit, namely the Q output of flip-flop FF3 goes to zero, flip-flop FF4 furnishes a "1" output at its Q output. Since flip-flop FF3 goes to zero only on the count of 000, flip-flop FF4 will furnish a "1" output only on this count. On the following clock pulse the Q output of flip-flop FF4 will again be low. Thus if the outputs of all four flip-flops are examined, it will be noted that the count will range from 1000 to 0001 without going to 000 or to any number exceeding 1000. With flip-flop FF4 constituting the most significant bit, the count on the four flip-flops will thus range from 1 to 8. This four-bit code is continually present at the input of register 203. Register 203 is loaded by the horizontal drive pulses. Since the oscillator 201 is not synchronized to horizontal drive, a random number is loaded into register 203 each time a horizontal drive pulse appears. The so-entered number is then read out serially under control of the 4 H oscillator 204. Since oscillator 204 is enabled only by the output of the six line counter 206, the signal at the output of register 203 will appear only during the first six lines of the vertical retrace interval and will, during these time intervals, contain a randomly selected number from the set of numbers 1-8. The signal at the output of gate 205 will be identical to the signal at the output of register 203, except when inhibit pulses are present at either of the two inhibit inputs of this gate.

The first inhibit pulse is applied to gate 1 when the validation code is to be transmitted. This takes place for six consecutive fields once for every second. Specifically, the vertical drive signals are applied to a frequency divider 208 which thus furnishes an output signal approximately two times each second. The output of frequency divider 208 toggles a flip-flop FF5. The Q output of flip-flop FF5, through a monostable multivibrator 208a is applied to the input of gate 209. The time constant of monstable multivibrator 208a is such that gate 209 is enabled for six consecutive fields after flip-flop FF5 switches to the Q output. The Q output of flip-flop FF5 is applied through a monostable multivibrator 208b to an enabling input of gate 212. The time constant of monostable multivibrator 208b is such that gate 212 is enabled for one vertical blanking interval following the switching of flip-flop FF5 to the Q output. The output of four line counter 207 is applied to the inputs of both gates 209 and 212, as is the output of the 4 H oscillator 204. During the six vertical blanking intervals during which gate 209 is enabled, the validation code is clocked out serially from register 210 and applied to an input of OR-gate 214. After each completed output from register 210, the register is reloaded automatically from validation code input 211, so that the correct validation code is present for the next readout.

Similarly, when gate 212 is enabled for one vertical blanking interval following the switching of flip-flop FF5 to the Q output, the contents of register 213 are read out serially and applied to the third input of OR-gate 214. When gate 212 is enabled, gate 205 is disabled, so that OR-gate 214 receives an input from register 213 only. Again, register 213 is automatically reloaded following each read out.

It is thus seen that the output of OR-gate 214 will comprise first of all random numbers in the first six lines of each vertical blanking interval. Secondly, once every second on the second a validation code will be sent out. During this time the transmission of the random numbers is inhibited. Thirdly, every second on the half second a program identification number acccompanied by the necessary identification flag and a catagory selector number will be sent out. The transmission of random numbers is also inhibited during this time period.

Figure 3:
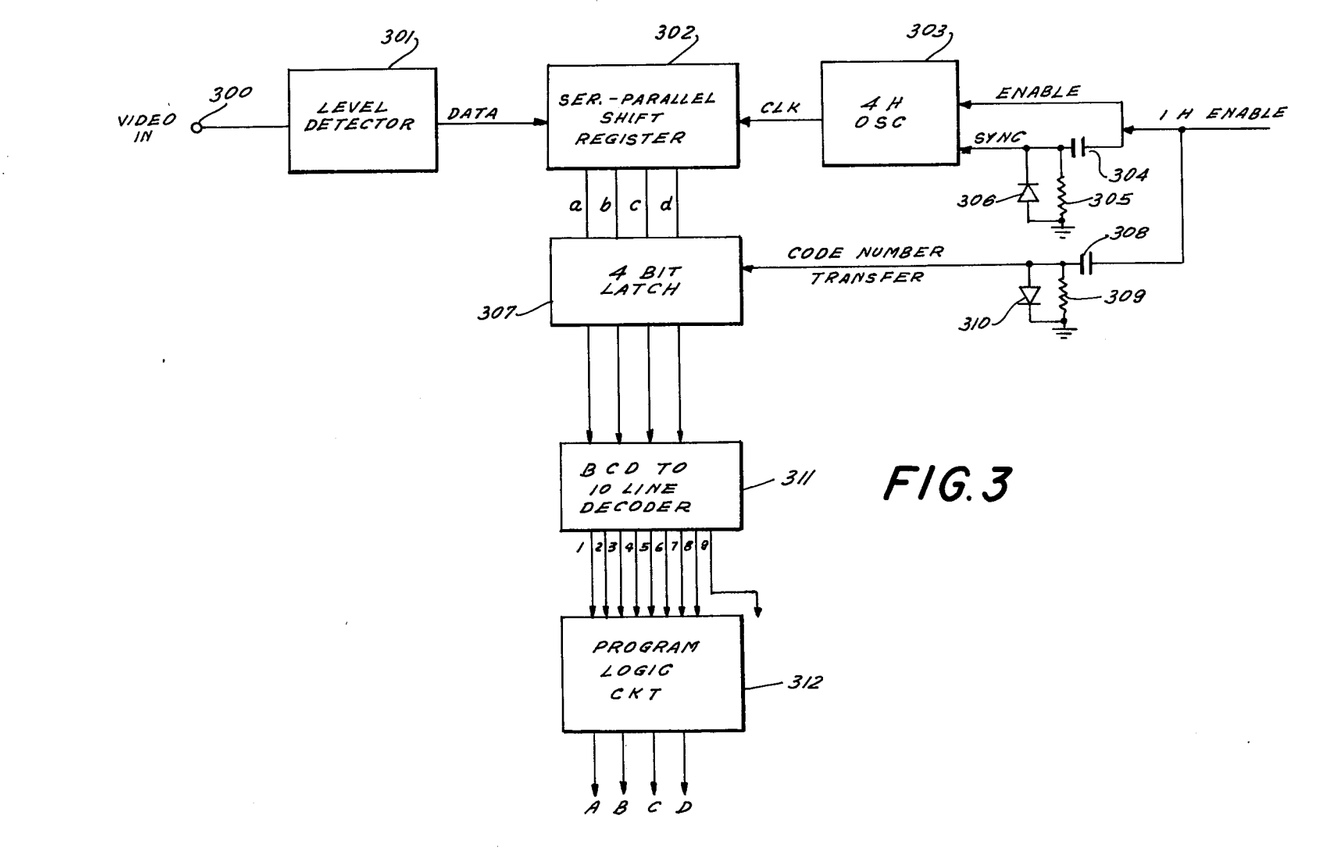
FIG. 3 is a block diagram showing the circuits at the receiving end, for detecting code number signals, and the logic circuits controlled thereby.

At the decoder, it is now required that these numbers be detected. The circuitry for detecting these numbers is shown in FIG. 3. The encoded television signal including the code numbers in the first six lines of the vertical retrace interval are received at terminal 300. The signal is applied to a level detector 301 which must be capable of detecting the "1" and "0" signals reliably independent of large changes in overall signal amplitudes. Detector 301 includes, in the main, a Schmitt trigger for which the 50% grey level is used as reference. Any signal larger than the 50% grey level to which the television signal is clamped will be interpreted as a "1" signal, while signals smaller than the 50% grey level signals will be "0" signals at the output of the detector 301. Further, an integrator circuit can be used at the input of the Schmitt trigger circuit to improve the signal-to-noise ratio. The output of detector 301 will thus constitute a pulse series of "1" and "0" signals. The signals are applied to the input of the series-parallel shift register 302. Shift register 302, however, does not accept pulses at all times, but only when enabled by the output of an oscillator 303. Oscillator 303 furnishes the oscillator output signal shown in FIG. 1. Specifically, the clock input of shift register 302 is strobed by the trailing edge of each pulse furnished by oscillator 303. Oscillator 303 is enabled only by the 1 H enable signals described above. Specifically, oscillator 303 is synchronized by the leading edge of the 1 H enable signal. The synchronizing signal is derived from the 1 H enable signal by passing it through a differentiator circuit including a capacitor 304, a resistor 305 and a diode 306 which shunts the differentiated signal generated by the trailing edge of the 1 H enable signal to ground potential.

The four bits constituting the binary coded decimal number in each of the lines is thus clocked into shift register 302 under control of clock pulses from oscillator 303. When the four bits of a particular line have been transferred into shift register 302, that is at the time of the trailing edge of the 1 H enable pulse, the contents of the shift register are transferred to the four bit latch 307. The code transfer pulse which causes the transfer from the shift register to the four bit latch is derived from the 1 H enable pulse by a differentiating circuit including a capacitor 308, a resistor 309, and a diode 310. This differentiating circuit is identical to that previously described for the leading edge of the 1 H enable signal, except for the fact that diode 310 is connected with opposite polarity to diode 306. The resultant code number transfer signal strobes four bit latch 307 to receive a number from shift register 302. The output of four bit latch 307 is connected to a decoder 311. Decoder 311 converts the binary coded decimal code at its input to a straight decimal code at the output, that is one of output lines 0-8 is energized in response to each signal combination at the input of the decoder.

The signals on lines 0-8 are applied to the inputs of a program assignment logic circuit 312 whose outputs constitute the signals "A", "B", "C" and "D" which determine the mode of the polarity flip-flop at the decoder. (Actually the signal on line C could be omitted since the polarity flip-flop is not affected by "C" signals.)

Figure 4:
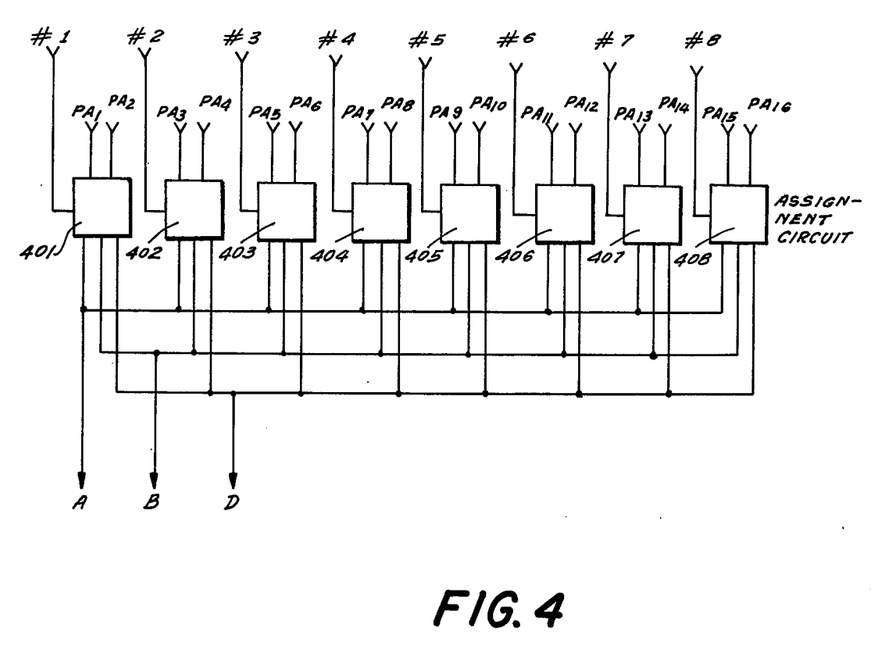
FIG. 4 shows the program assignment logic circuit block of FIG. 3 in greater detail.

FIG. 4 shows the program assignment logic circuit block 312 of FIG. 3 in greater detail. Lines numbered 1-8 shown in FIG. 4 are the output lines of the decoder 311 of FIG. 3. The lines labelled PA1, PA2, ... PA15, PA16 are inputs derived from the program identification number as will be discussed in greater detail below. Essentially, each pair of program assignment numbers PA1, PA2; PA3, PA4; etc. controls the transmission of one of the program numbers 1-8 furnished by decoder 311 through a corresponding one of the individual assignment circuits 401-408 to one of the outputs A, B or D. Individual assignment circuit 401 is shown in greater detail in FIG. 4a. The remaining individual assignment circuits are identical to circuit 401 with the exception that of course the inputs are as specified in FIG. 4.

Figure 4A:
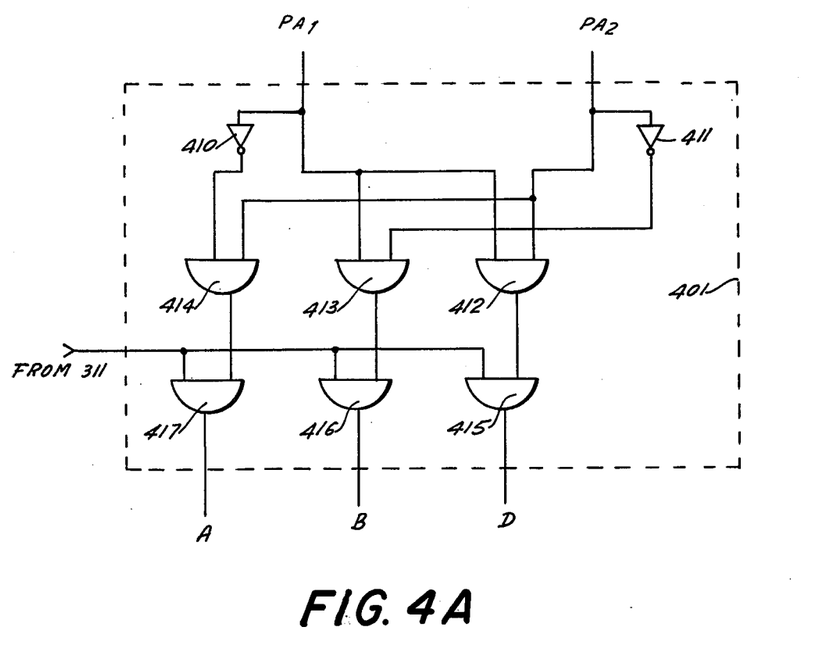
FIG. 4a is a more detailed schematic diagram of the individual program assignment circuits of FIG. 4.

Referring now to FIG. 4a, Line PA1 is directly connected to the first inputs of two AND-gates 412 and 413 and is connected through an inverter 410 to the input of further AND-gate 414. Similarly, line PA2 is directly connected to the input of AND-gates 412 and 414 and, through an inverter 411, to the input of AND-gate 414. The outputs of AND-gates 412, 413 and 414 are respectively connected to the first inputs of AND-gates 415, 416 and 417. The second inputs of AND-gates 414–417 are connected in common to output line 1 of decoder 311. Thus it is seen that in the absence of a signal on line PA1 and the presence of a signal on line PA2, AND-gate 414 is conductive, while AND-gates 412 and 413 are blocked. Upon receipt of code number 1, AND-gate 417 will therefore furnish an output which energizes the A output. Similarly, the presence of a signal on line PA1 and the absence of a signal on line PA2 will result in a B output upon receipt of code number 1, while the presence of signals on both lines PA1 and PA2 will result in a D output upon receipt of code number 1 from the decoder 311. It is thus seen that the assignment of the signal from decoder 311 to A, B or D outputs takes place under control of the program assignment inputs, which in turn are derived from the program identification numbers as will be discussed below.

As previously stated, during the vertical retrace interval code information is transmitted during six consecutive lines. Each line contains, at random, one of the eight decimal numbers 1 through 8. These numbers are herein referred to as code numbers. Approximately once per second, the first lines of the six line sequence are used to transmit a program identification number in the following manner. The first line is a "9", which serves as an identification flag. The two following lines contain two digits of a hexadecimal number. Each digit runs from 0 to F, where the letters A to F are used to symbolize numbers 10–15. The fourth line contains a hexadecimal number used for category selection which will be discussed below. The program identification number is used for two purposes. The first is to select one out of a group of assignment codes stored within the decoder, that is, to select one set of values for lines PA1–PA16 of FIG. 4. The second function is to store the eight bits confirming that number in a memory when the subscriber decides to accept the program. This is then used as the base for billing information and will not be discussed further herein.

As reference to FIG. 4 shows, each assignment code is a 16 bit word, the bits being taken in pairs (PA1, PA2; ... PA15, PA16). The sixteen bit word is extracted as a byte from a 48 bit string stored in a random access memory in the decoder. The first byte includes bits 1–16. The second byte is obtained by shifting one place to the right (to start at bit 2). Thirty-two such bytes are possible from a forty-eight bit string. Since every bit in each code is shifted by one place, adjacent codes are quite different from one another even though there is only one new bit in each code. It is of course the function of the program identification number, namely the two digit hexadecimal number, to select one of these thirty-two assignment codes (bytes). Since 256 different program identification numbers can be formed from the combinations 00 to FF of two hexadecimal digits, eight program identification numbers are allocated to each program assignment code (32 × 8 = 256). When a program identification number from 00 to 07 is received, program assignment code 1 is selected. A number from 08 to 15 cause the selection of program assignment code 2, etc.

Figure 5:
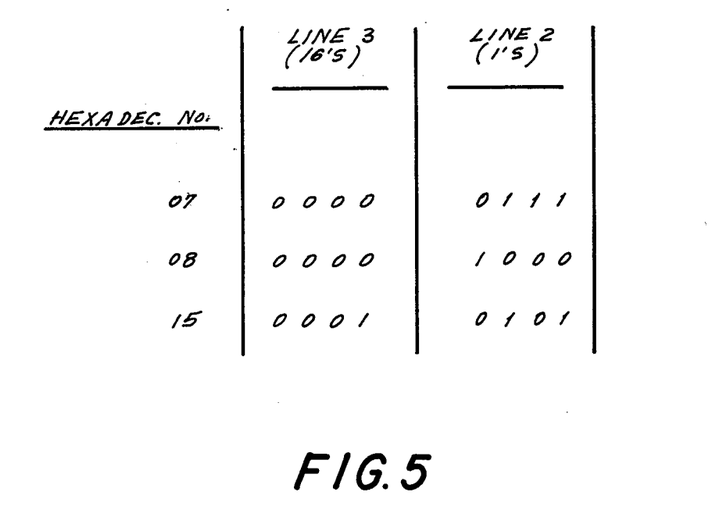
FIG. 5 illustrates a number of hexadecimal program identification numbers.

The logic implementation of this selection process will best be understood with reference to FIG. 5. FIG. 5 is a table wherein the first column is headed "Line 3" while the second column is headed "Line 2". The four bits transmitted above as described in line 2 represent units, while the four bits transmitted in line 3 represent 16's. The hexadecimal number 07 will thus be represented by four zero bits in line 3 and the sequence 0111 in line 2. The hexadecimal number 08 will be represented by four zero bits in line 3 and the sequence 1000 in line 2. Hexadecimal number 15 (of which the decimal equivalent is 21) will be represented by the sequence 0001 in line 3 and the sequence 0101 in line 2. It will be noted that the three least significant bits, namely the three rightmost bits in line 2 together form numbers from 0 to 7. Therefore, since eight program numbers are allocated to each program assignment code, only the five most significant bits, that is all bits on line 3 and the most significant bit on line 2 will be examined in order to select a program assignment code.

The fourth line of the six lines which normally carry the randomly selected numbers contains a hexadecimal number from O to F which is used to category selection. Category selection is an optional feature, but the type of coding used in the present invention is particularly suitable for implementing a category selection capability. The bits in line 4 are treated independently. There are three types of programs and three categories in two of these types.

| Type | | |
|---|---|---|
| | (a) Home | General |
| | | Parental Guidance |
| | | Restricted |
| | (b) Special | Doctors |
| | | Lawyers |
| | | Educational |
| | (c) Tavern | |

The selection of programs on the decoder is as follows: A selector switch is mounted on the front panel. When the switch is set at "General", only programs meant for general audiences can be decoded. When set at the "Parental Guidance" position, both "Parental Guidance" and "General" programs will be decoded. When set to "Restricted", all three types of programs can be received. When the switch is set to receive "Special" programs, hard wired jumpers within the decoder determine which type of program may be watched. For instance, if the decoder is wired up for a "Doctors" special and an "Educational" program is being transmitted, the decoder will not unscramble even though the switch is in the special position.

It is also possible to inhibit Tavern decoder from unscrambling while other audiences are allowed to watch the program.

The implementation of the above-described logic operations will now be described with reference to FIG. 6.

Figure 6:
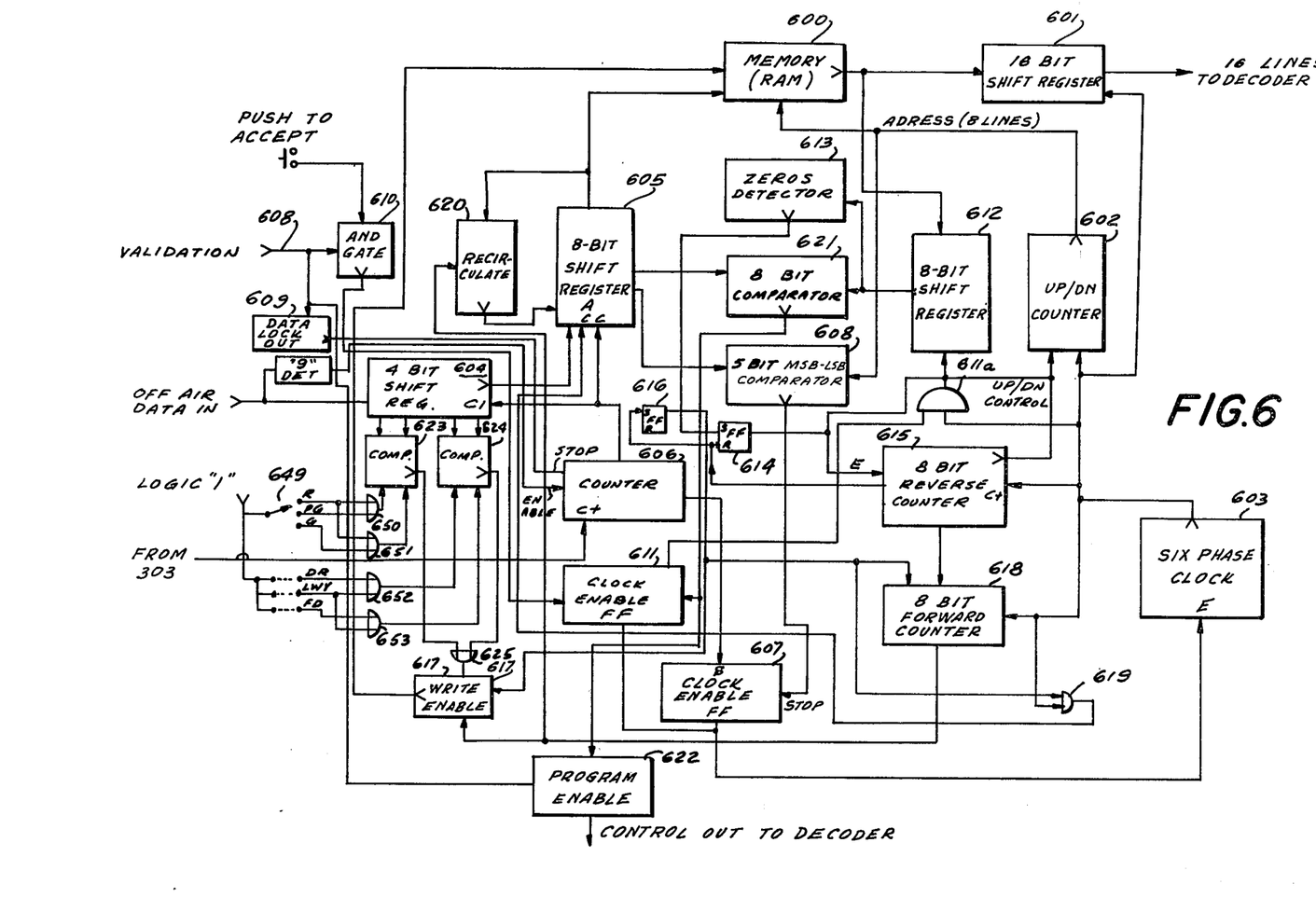
FIG. 6 is a schematic block diagram of the decoder circuitry at the receiving end.

Shown in FIG. 6 is the random access memory 600 which is the 256 bit memory described above. A part of the function of the circuitry in FIG. 6 is to transfer the 16 bit program assignment code selected by the program identification number on the incoming television signal to the 16 bit shift register 601. The parallel output of the 16 bit shift register 601 constitutes lines PA1; ... PA16 of FIG. 4. Random access memory 600 is addressed by eight address lines constituting the output of an up/down counter 602. The counting input of counter 602 is connected to the output of a six phase clock 603. Also shown in FIG. 6 is a four bit shift register 604 connected in series to an eight bit shift register 605. The data input of four bit shift register 604 is connected to the output of detector 301 in FIG. 3. The clock input to shift registers 604 and 605 is the output of a 12 pulse counter 606. The counting input of counter 606 is connected to the output of 4 H oscillator 303 of FIG. 3. The counter operates after being enabled by the "9" signal from decoder 305. Since the program identification number is transmitted on lines 2 and 3 of the vertical retrace interval and thus corresponds to the first eight pulses from oscillator 303 following the detection of the "9" signal, the program identification number will have been shifted into shift register 605 at the time the twelfth pulse is received from counter 606. At this time also, the category selection number will be stored in register 606. The operation of counter 604 ceases after twelve pulses have been counted. The overflow pulse from counter 606 is used to set a clock enable flip-flop 607 to start enabling six phase clock 603. Pulses from the six phase clock 603 are applied to up/down counter 602 causing it to count in the up mode. Addresses for memory 600 are thus furnished at the output of counter 602. In comparator 608, the five most significant bits stored in shift register 605 are compared to the five least significant bits in the address furnished by counter 602 (it will be remembered that the five most significant bits of the program identification number together determine the address for memory 600). As memory 600 is addressed, the program assignment numbers stored in the addressed locations in the memory are shifted serially into shift register 601. When comparator 608 furnishes an output signal indicating agreement between the five most significant bits in shift register 605 and the five least significant bits in the address furnished at the output of counter 602, clock enable flip-flop 607 is switched to the state wherein clock 603 is disabled. The count of the counter then corresponds to the address in memory 600 wherein the program assignment number specified by the program identification number is stored. Further, the program assignment number is also located in shift register 601, causing lines PA1–PA16 of FIGS. 4 and 4a to be energized in accordance with the same code used at the transmitter so that code numbers received over the air in the next-following vertical retrace intervals will be properly routed to the A, B and D outputs.

As discussed in the above-identified Nieson application, it is desirable, in subscription television equipment, to validate the reception of the correct code and the correct decoder set-up at the receiver prior to allowing the subscriber to receive the program and prior to a charge being entered for said program. A signal indicative of validation, that is of the correct setup at the decoder and the correct reception of the code, is furnished at terminal 608. These signals are generated, in the preferred embodiment of the present invention, at one second time intervals but, if the program identification number is sent on the second, validation will take place on the half second. Receipt of a validation signal causes data lock out 609 to disable counter 606, that is to prevent any further counting by this counter. In a preferred embodiment of the present invention, data lock out 609 is a monostable multivibrator whose time constant is set for a time interval less than one-sixtieth of a second but sufficient to insure that the validation signal is no longer present at terminal 608.

A signal at terminal 608 also allows an "accept" signal generated by the pushing of the "push to accept" button to be applied to a clock enable flip-flop 611 via AND-gate 610. This causes this flip-flop to assume a state wherein six phase clock 603 again starts furnishing pulses to up/down counter 602. Since the subscriber has pushed the "push to accept" button, it is now required that the program identification number be entered into memory 600 for later billing purposes. The identification number bits must of course be entered into the first empty locations of the 168 locations in memory 600 which are devoted to billing.

Following the enabling by clock enable flip-flop 611 six phase clock 603 furnishes pulses to up/down counter 602 which continues counting in the up mode. The numbers stored in the locations addressed by the output lines of the counter are shifted serially into an eight bit shift register 612. The shifting into shift register 612 is controlled by the clock pulses from clock 603 in the presence of an enable signal from clock enable flip-flop 611, i.e. by the output of AND-gate 611a. The parallel output of shift register 612 is applied to the input of a zero detector 613 which in a preferred embodiment of the present invention is a NAND-gate furnishing an output signal only when all of its inputs are 0 signals. Upon detection of the eight zero bits, zero detector 613 furnishes an empty position signal to flip-flop 614. Flip-flop 614 is set, causing up/down counter 602 to count in the reverse mode. Further, setting of flip-flop 614 enables an eight bit counter 615 which counts the next-subsequent eight output pulses of clock 603. Upon reaching the count of 8 counter 615 furnishes a signal resetting flip-flop 614 removing the down control signal on counter 602, causing it again to count the up mode. Further a flip-flop 616 is set which energizes the write enable circuit 617 thereby allowing recording into memory 600. Also a counter 618 which is an eight bit counter identical to counter 615 is energized. Counter 618 commences the counting of the nextsubsequent eight clock pulses from clock 603. The signal from flip-flop 616 is further used to put an AND-gate 619 to the conductive state, allowing clock pulses from clock 603 to be applied to the clock input of eight bit shift register 605. The information in eight bit shift register 605 is therefore transferred serially to memory 600. The output pulse of flip-flop 616 further activates the recirculating circuit 620 which causes each bit shifted out of shift register 605 to be reapplied to its input. The eight bits constituting the program identification number are thus restored in shift register 605 simultaneously with being stored in memory 600. The count of 8 from counter 618 then causes a resetting of flip-flop 616, breaking the connection between shift register 605 and memory 600 as well as deenergizing write enable circuit 617.

Since throughout the above operation flip-flop 611 was still in the set state and since memory 600 is the type of memory wherein a read-out takes place simultaneously with the write-in operation, the program identification number can now also be found in shift register 612.

The number in register 612 and the number in register 605 are compared by an eight bit comparator 621. As soon as the program identification number has been stored in memory 600, eight bit comparator 621 will furnish a coincidence signal which resets flip-flop 611.

Clock 603 stops. Further, the coincidence signal from eight bit comparator 621 switches a program enable flip-flop 622 to the set state. When flip-flop 622 is in the set state a control signal is furnished to the decoder which allows viewing of the decoded picture.

It will be seen that with the above-described system the program identification number is stored in the memory before the program can be watched. Each program identification number is stored only once, since, if the number has been previously stored, comparator 621 will reset flip-flop 611 when the number is read out from storage 600. Further, the program identification number cannot be stored in the memory unless validation is present, that is unless the correct program identification number is transmitted over the air, received, and the decoder at the receiver is properly set in correspondence to this number.

A further feature shown in FIG. 6 is the comparison by a comparator 623 of the number set into shift register 604, that is the category selection number transferred in the fourth line of the vertical retrace interval, to a number set into the comparator by operation of the category selection switch by the viewer or by the hardwire jumpers mentioned above. A signal from this comparator is also required for enabling write enable 617. If it is absent, the number in shift register 605 will never be entered into memory 600 and there will never be an output signal from comparator 621. This of course will prevent the program enable flip-flop 622 from being set and therefore the program will under no circumstances be viewed by a subscriber. Since the program identification number is also not entered into memory 600 no billing will take place. As also shown in FIG. 6, the selector switch has a selector arm 649 which can be moved to select between terminals G, PG and R. The G terminal constitutes one input of an OR-gate 650 whose other input is derived from the R terminal. The R terminal is also connected to one input of an OR-gate 651 whose other input is derived from the PG terminal. The output of OR-gate 650 is applied to the least significant bit input on the A side of a comparator 623, while the output of OR-gate 651 is applied to the next significant bit on the A side of this comparator. The B side of this comparator receives the two least significant bits from register 604, that is the two least significant bits from the category selection number, which is coded 01, 10 and 11 for G, PG and R programs respectively, the least significant bit being the rightmost bit. The output of comparator 623 is taken from the terminal which furnishes a "1" output whenever A is equal to or greater than B. Thus if a G setting is selected by the subscriber, only G programs will cause a "1" output to be furnished by comparator 623, while setting to the R selector input allows a "1" output to appear at comparator 623 independent of the digit value applied to the B terminals. A "1" output will thus appear at comparator 623 if the R terminal is selected by the subscriber and a G, PG or R program is being broadcast. The DR, LWY and ED terminals are terminals inside of the set which are hardwired depending upon which category is selected by the subscriber. The DR terminal forms one input on OR-gate 652 whose other input is derived from the LWY terminal. The LWY terminal is also connected to one input of an OR-gate 653 whose other input is derived from the ED terminal. The output of OR-gates 652 and 653 are applied to the A input of a comparator 624. The other side of comparator 624, namely the B side, receives the inputs from the two most significant digits from register 604. The output for comparator 624 is taken from the A=B terminal. Comparator 624 will thus furnish a "1" output only if the program specified by the hard-wire connection is being transmitted. The output of comparator 623 as well as the output of comparator 624 are applied to an OR-gate 625 whose output serves as one enable input for write enable circuit 617. Thus if there is disagreement between the category selected by the subscriber and the category of the program then being received, there will be no signal at the output of selection comparator 623.

It is seen that the present invention offers a particularly simple and economical system of binary encoding and decoding for purposes of scrambling and unscrambling the television signal and a system which is particularly suitable for recording the viewed program numbers for later billing purposes. The system of the present invention also requires a minimum of effort by the subscriber in receiving the desired programs and being billed therefor.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Subscription television system comprising, in combination, at the transmitting end: means for encoding the television signals together constituting a given program in accordance with a selected one of a plurality of encoder modes; means for inserting a program identification number signifying said program into said television signal at predetermined time instants thereof; and transmitting means for transmitting the so-encoded television signals with the so-inserted program identification number to all subscribers;

for each of said subscribers: receiving means for receiving the so-transmitted television signal; detecting means for detecting said program identification number and furnishing corresponding detected program identification signals; accept signal furnishing means for furnishing an accept signal indicative of acceptance of said program by said subscriber upon activation by said subscriber; main storage means having a plurality of billing storage locations for storing program identification numbers for subsequent billing; and recording means connected to said detecting means and said accept signal furnishing means, for recording said detected program identification signals in said billing storage locations only upon receipt of said accept signal, whereby only program identification numbers signifying programs accepted by said subscriber are stored in said billing storage locations of said main storage means.

2. A system as set forth in claim 1, wherein said main storage means comprises a random access memory.

3. A system as set forth in claim 2, wherein said addressing means comprise pulse generating means furnishing clock pulses, counting means connected to said pulse generating means for counting said clock pulses and furnishing counting output signals corresponding to the number of so-counted clock pulses, program identification storage means connected to said detecting means for storing said detected program identification signals thereby furnishing stored program identification signals; comparator means connected to said counting means and said program identification storage means for comparing said counting output signals to said stored program identification signal and furnishing a comparator output signal when a predetermined relationship exists between the so-compared signals; and means for stopping said pulse generating means in response to said comparator output signal, whereby the counting output signal at said counting outputs constitutes an address signal for addressing said main storage means.

4. A system as set forth in claim 3, wherein said random access memory has a first plurality of storage locations for storing said program assignment signals and a second plurality of storage locations; wherein said counting means has a predetermined number of counting outputs corresponding to the number of bits required to address all of said storage locations in said random access memory; wherein each of said program identification numbers comprises a predetermined number of bits including a first set of bits required for addressing one of said storage locations in said first plurality of storage locations of said random access memory and a second set of bits; and wherein said comparator means comprise means for comparing the bits in said first set of bits to signals at corresponding ones of said counting outputs.

5. A system as set forth in claim 4, wherein said first set of bits comprise the most significant bits of said program identifications numbers and wherein said corresponding ones of said counting outputs comprise counting outputs furnishing the least significant bits of said address signals.

6. A system as set forth in claim 3, further comprising shift register means for storing program identification signals read out from said main storage means under control of said counting output signals; additional comparator means interconnected between said shift register means and said program identification storage means furnishing an additional comparator output signal when the so-compared signals are equal; and inhibiting means connected to said additional comparator means and said recording means for inhibiting the operation of said recording means upon receipt of said additional comparator output signal, whereby a program identification number is stored only once in said random access memory.

7. A system as set forth in claim 6, wherein each of said counting output signals addresses an individual bit in said random access memory; further comprising zero detector means connected to said shift register means for furnishing a zero detect output signal upon receipt of a number of zeros corresponding to the number of bits in each of said program identification numbers; means for reversing the counting direction of said counting means in response to said zero detect output signal, and means for again reversing the counting direction of said counting means following a reverse count of a number of bits corresponding to the number of bits in each of said program identification numbers.

8. A system as set forth in claim 1, further comprising, at said transmitting end, category number signal furnishing means for furnishing a category selection number; wherein said inserting means further comprise means for inserting said category selection number into said television signal; wherein said detecting means further comprises means for furnishing said category selection number in response to the received encoded television signal; further comprising means for storing said category selection number at the receiving end, thereby furnishing a stored category selection number, switch means for furnishing a selected category selection number under subscriber control, and category comparing means for comparing said stored category selection number to said selected category number and enabling the operation of said recording means and said pulse generating means only when said stored category selection number has a predetermined relationship to said selected category number.

9. Apparatus as set forth in claim 1, wherein said main storage means further has a plurality of assignment code storage locations selectively addressable by said detected program identification signals, for storing program assignment codes each corresponding to one of said encoder modes; further comprising addressing means interconnected between said detecting means and said main storage means, for addressing the assignment code storage location signified by said detected program identification signals, reading out the program assignment codes stored therein and furnishing corresponding program assignment code signals, and decoding means having control inputs connected to receive said program assignment code signals, for decoding said received television signal under control of said program assignment code signals.

10. Apparatus as set forth in claim 9, wherein said decoding means comprises logic circuit means having said control inputs and further having signal inputs and logic outputs, and means for changing a predetermined characteristic of said television signal from an encoded to a normal state in response to a signal at a selected one of said logic outputs; wherein said program assignment code signals selectively block or permit the transmission of signals from each of said signal inputs to said selected one of said logic outputs; further comprising, at said transmitting end, means for generating a plurality of code numbers each associated with one of said signal inputs, inserting means for inserting randomly selected ones of said code numbers into said television signal at predetermined time instants thereof and means for changing a predetermined characteristic of said television signal from a normal to an encoded value in correspondence to the so-inserted code number processed in accordance with said selected encoder mode; wherein said detecting means further comprises means for detecting said code numbers and furnishing detected code number signals in response thereto; further comprising means interconnected between said detecting means and said signal inputs of said logic circuit means, for energizing the signal input signified by said code number in response to said detected code number signals, whereby the so-encoded television signal is correctly decoded only under control of program assignment code signals corresponding to said selected encoder mode.

11. A system as set forth in claim 3, further comprising enabling means connected to said accept signal furnishing means and said pulse generating means, for enabling said pulse generating means only in response to said "accept" signal.

* * * * *